United States Patent
Fannin et al.

(10) Patent No.: US 10,447,588 B1
(45) Date of Patent: Oct. 15, 2019

(54) DECENTRALIZED INTEGRATED MODULAR AVIONICS (IMA) PROCESSING

(71) Applicant: Rockwell Collins, Inc., Cedar Rapids, IA (US)

(72) Inventors: Timothy R. Fannin, Urbana, IA (US); Nicholas H. Bloom, Marion, IA (US); Matthew P. Corbett, Mount Vernon, IA (US); Eric N. Anderson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 51 days.

(21) Appl. No.: 15/636,433

(22) Filed: Jun. 28, 2017

(51) Int. Cl.
| | | |
|---|---|---|
| *H04L 12/775* | (2013.01) | |
| *H04L 12/935* | (2013.01) | |
| *B64D 43/00* | (2006.01) | |

(52) U.S. Cl.
CPC .............. *H04L 45/58* (2013.01); *B64D 43/00* (2013.01); *H04L 49/30* (2013.01)

(58) Field of Classification Search
CPC ......... H04L 45/58; H04L 49/30; H04L 49/00; H04L 49/10; H04L 49/102; H04L 49/15; H04L 49/1507; H04L 49/20; H04L 49/25; H04L 49/253; H04L 49/254; H04L 49/35;
(Continued)

(56) References Cited

U.S. PATENT DOCUMENTS

| | | | | |
|---|---|---|---|---|
| 8,301,867 | B1 * | 10/2012 | Mazuk | G06F 11/1625 398/66 |
| 8,683,105 | B1 * | 3/2014 | Shultz | G06F 3/1423 709/230 |
| 9,137,038 | B1 * | 9/2015 | Mazuk | G06F 11/14 |

(Continued)

OTHER PUBLICATIONS

L. M. Kinnan, "Use of multicore processors in avionics systems and its potential impact on implementation and certification," 2009 IEEE/AIAA 28th Digital Avionics Systems Conference, Orlando, FL, 2009, pp. 1.E.4-1-1.E.4-6 http://ieeexplore.ieee.org/stamp/stamp.jsp?tp=&arnumber=5347560&isnumber=5347412.*

(Continued)

*Primary Examiner* — Maharishi V Khirodhar
*Assistant Examiner* — Kenneth P Hunt
(74) *Attorney, Agent, or Firm* — Angel N. Gerdzhikov; Donna P. Suchy; Daniel M. Barbieri

(57) ABSTRACT

A decentralized Integrated Modular Avionics (IMA) architecture configured for onboard avionics processing eliminates centralized computing cabinets and distributes avionics processing capabilities to a network of smart switching devices positioned throughout the aircraft, each smart switch including a multicore processing environment (MCPE) for generalized application hosting in addition to the switching elements. The smart switching network can be scaled up or down for smaller or larger aircraft, or organically grown by adding more processing components. Additional real-time multicore processors may be located in smart remote data concentrators (RDC) for handling I/O and routing of net- (Continued)

work data between external remote units and aircraft systems and the hosted applications on the smart switches. The real-time environments executing on the smart RDCs may be reserved for low-latency closed-loop functions, or may host additional general-purpose avionics processing.

16 Claims, 5 Drawing Sheets

(58) Field of Classification Search
CPC ..... H04L 49/351; H04L 49/40; H04L 49/405; H04L 49/45; B64D 43/00
See application file for complete search history.

(56) References Cited

U.S. PATENT DOCUMENTS

| | | | | |
|---|---|---|---|---|
| 9,389,665 B1* | 7/2016 | Hagen | ................ | G06F 11/0724 |
| 2013/0138271 A1* | 5/2013 | Danielsson | ........... | H04L 67/322 |
| | | | | 701/3 |
| 2014/0282572 A1* | 9/2014 | Kang | .................... | G06F 9/4881 |
| | | | | 718/103 |
| 2014/0297798 A1* | 10/2014 | Bakalash | ............. | G06F 9/5044 |
| | | | | 709/217 |
| 2015/0022373 A1* | 1/2015 | Bommer | ............... | G08C 17/02 |
| | | | | 340/870.11 |
| 2015/0102660 A1* | 4/2015 | Shander | .................... | B64C 1/06 |
| | | | | 307/9.1 |
| 2015/0347195 A1* | 12/2015 | Toillon | ..................... | G06F 9/52 |
| | | | | 718/100 |
| 2017/0212791 A1* | 7/2017 | Laskowski | ............ | G06F 9/5027 |

OTHER PUBLICATIONS

J. Kim, M. Yoon, R. Bradford and L. Sha, "Integrated Modular Avionics (IMA) Partition Scheduling with Conflict-Free I/O for Multicore Avionics Systems," 2014 IEEE 38th Annual Computer Software and Applications Conference, Vasteras, 2014, pp. 321-331. http://ieeexplore.ieee.org/stamp/stamp.jsp?tp=&arnumber=6899233&.*

H. Agrou, P. Sainrat, M. Gatti and P. Toillon, "Mastering the behavior of multi-core systems to match avionics requirements," 2012 IEEE/AIAA 31st Digital Avionics Systems Conference (DASC), Williamsburg, VA, 2012, pp. 6E5-1-6E5-12. http://ieeexplore.ieee.org/stamp/stamp.jsp?tp=&arnumber=6382403&isnumber=6382265.*

X. Jean, M. Gatti, D. Faura, L. Pautet and T. Robert, "A software approach for managing shared resources in multicore IMA systems," 2013 IEEE/AIAA 32nd Digital Avionics Systems Conference (DASC), East Syracuse, NY, 2013, pp. 7D1-1-7D1-15 http://ieeexplore.ieee.org/stamp/stamp.jsp?tp=&arnumber=6712643&isnumber=6712.*

* cited by examiner

US 10,447,588 B1

DECENTRALIZED INTEGRATED MODULAR AVIONICS (IMA) PROCESSING

BACKGROUND

Integrated Modular Avionics (IMA) architectural approaches vary widely in implementation, but the fundamental concept involves the replacement of application-specific processors and line replaceable units (LRU) of federated systems with more generalized processing units, high-speed communications, and shared I/O resources. The result has been significant weight reductions and maintenance savings relative to federated avionics solutions. However, current IMA architectures rely on centralizing processors in an avionics cabinet, and therefore may not be able to meet customer demands for lower system latencies at lower costs.

SUMMARY

In one aspect, embodiments of the inventive concepts disclosed herein are directed to a decentralized integrated modular avionics (IMA) network architecture that distributes IMA processing functionality throughout the aircraft without the use of a central computing cabinet. The decentralized IMA architecture includes a network of smart switches, or network switching devices, including multicore processing environments (MCPE) on which general avionics processing applications may execute. Each smart switch includes, in addition to the MCPE, switching elements for routing application data between the smart switch MCPEs and remote units throughout the aircraft (e.g., display units, aircraft sensors and other LRUs).

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
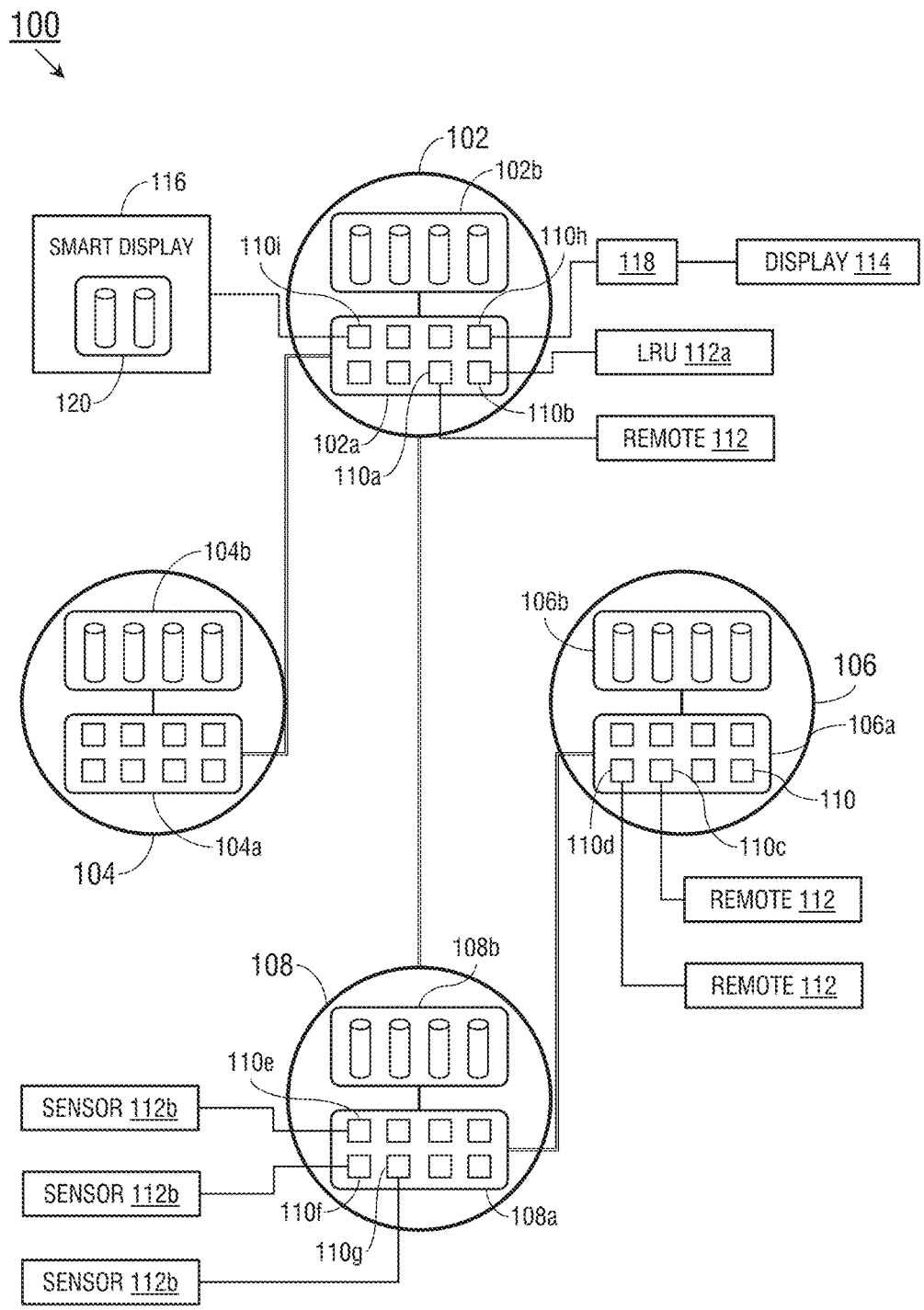
FIG. 1 is a diagrammatic illustration of an exemplary embodiment of a decentralized integrated modular avionics (IMA) architecture according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a decentralized Integrated Modular Avionics (IMA) architecture. A decentralized architecture removes the centralized computing cabinets and distributing general avionics processing to smart switches, cutting latency to I/O resources and reducing overall equipment counts and costs. In addition, a decentralized architecture more easily scales up or down in size and complexity for larger or smaller aircraft, and allows for organic, dynamic growth of processing capability in response to changing mission needs.

Referring to FIG. 1, an exemplary embodiment of a decentralized Integrated Modular Avionics (IMA) architecture 100 according to the inventive concepts disclosed herein may include a switching network of smart switches 102, 104, 106, and 108. The decentralized IMA architecture 100 may distribute the processing capabilities of the avionics network throughout an embodying aircraft by eliminating centralized computing cabinets (and the dedicated centralized processing element housed therein) and integrating avionics processing into the smart switches 102-108. The decentralized IMA architecture 100 may be scaled up or down (e.g., in terms of the number of smart switches 102-108 deployed) depending on the embodying aircraft, and may be grown organically (e.g., via the addition of new smart switches 102-108, remote data concentrators (RDC), or dedicated computing resources) if changing mission needs call for increased connectivity aboard the aircraft.

Each smart switch 102-108 may include a switching element (102a-108a) and a high integrity MCPE (102b-108b), the MCPE 102b-108b serving as the primary processing platforms for general avionics processing applications. Each MCPE 102b-108b may be connected (e.g., via 1 GB fiber link) to its counterpart switching element (102a-108a). A given switching element 102a-108a may incorporate multiple switch ports (110) through which the switching elements 102a-108a may receive network data from remote units (112) throughout the aircraft (e.g., depending on the data content requirements of the hosted applications executing on each MCPE 102b-108b), routing the network data to the appropriate processing cores and hosted applications. Switch ports 110 may include both copper and fiber ports (e.g., in groups of four). For example, the MCPE 102b of the smart switch 102 may (through its switching element 102a) receive network data from the remote unit 112 and the LRU 112a via switch ports 110a-b. Similarly, the MCPE 106b of the smart switch 106 may receive network data through switch ports 110c-d of the switching element 106a from other remote units (112). Remote units 112 or LRUs 112a may include aircraft sensors 112b (e.g., pitot-static systems, absolute or satellite-based position sensors, inertial measurement units (IMU), altimeters, temperature sensors), which may feed data to the MCPE 108b of the smart switch 108 through switch ports 110e-g of the switching element 108a. In some embodiments, the smart switch 102 may be connected to remote display units (114) or smart display units (116) through switch ports 110h-i of the switching element 102a. For example, the remote display unit 114 may be a conventional LCD-based or LED-based display system connected to the smart switch 102 (e.g., at switch port 110h) via external display and graphics processors (118). The smart display unit 116 may incorporate a display/graphics MCPE (120) for internal handling of display and graphics generation processing. Each MCPE 102b-108b may incorporate multiple processing cores (and/or logical partitions of physical processing cores) on which ARINC 653 guest operating systems (GOS) and/or third-party avionics applications may be configured to execute. Each hosted avionics processing application may have particular network data content requirements. For example, navigational applications may require continually updated position information from GNSS-based or inertial position sensors (112b) throughout the aircraft, the network data content requirements of each particular hosted application fulfilled through the switching elements 102a-108a. Some smart switches (e.g., smart switching element 122a of portside smart switch 122) may be directly connected to remote units 112. Other remote units may be connected to the switching network through input/output engines as described in greater detail below.

Figure 2A:
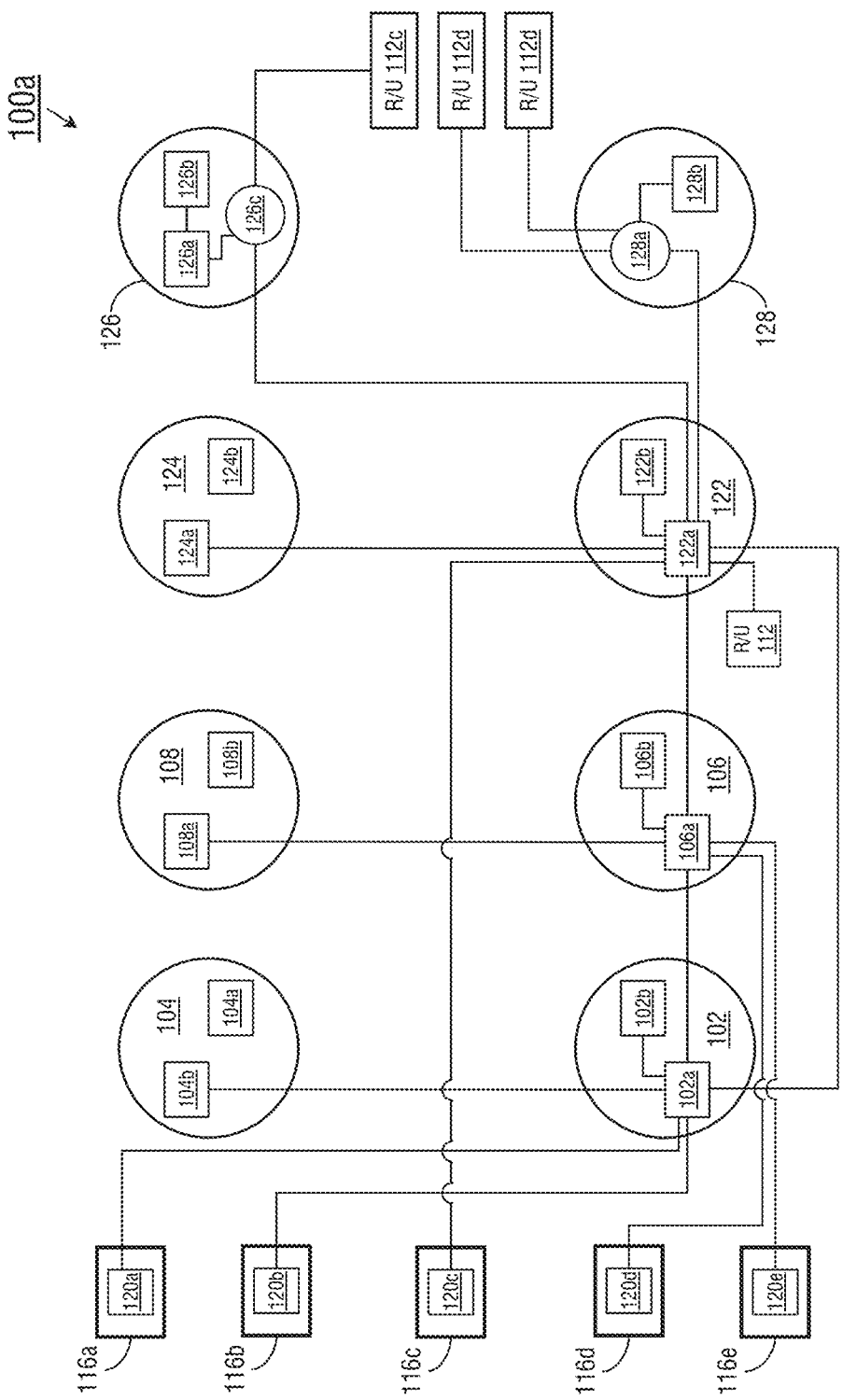
FIGS. 2A and 2B are, respectively, diagrammatic port-side and starboard-side illustrations of the decentralized IMA architecture of FIG. 1.
Figure 2B:
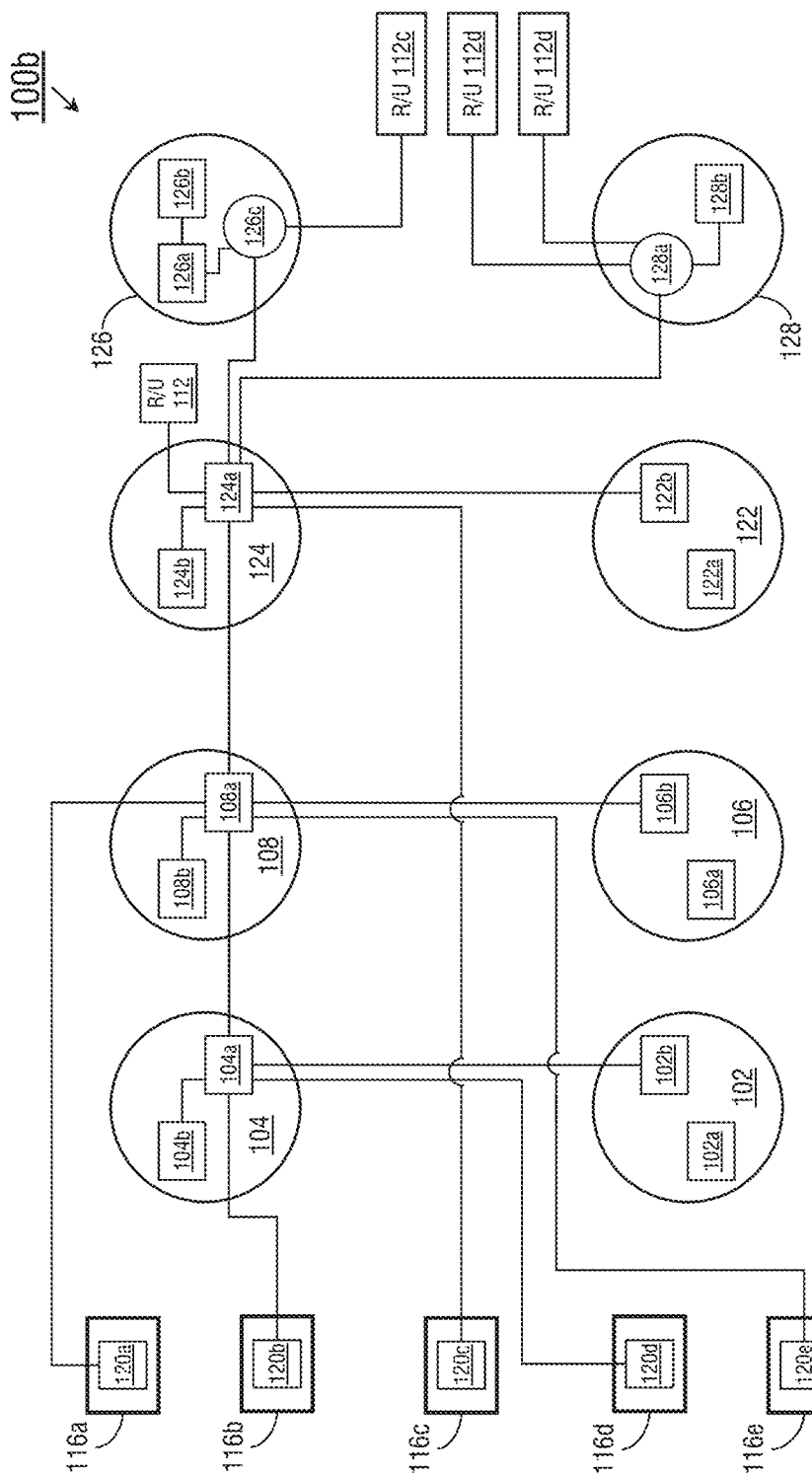

Referring to FIGS. 2A and 2B, the onside decentralized IMA architecture 100a and cross-side decentralized IMA architecture 100b may be implemented and may function similarly to the decentralized IMA architecture 100 of FIG. 1, except that the onside decentralized IMA architecture 100a and cross-side decentralized IMA architecture 100b may be implemented with respect to, for example, the respective port and starboard sides of an embodying aircraft. For example, the smart switches 102, 106, and 122 may be onside smart switches positioned proximate to the port side of the aircraft, and the smart switches 104, 108, and 124 may be cross-side smart switches positioned opposite the onside smart switches 102, 106, 122 (or, proximate to the starboard side of the aircraft). The precise locations of, or connections between, each onside smart switch 102, 106, 122 and cross-side smart switch 104, 108, 124 may vary according to a variety of factors including, but not limited to, the aircraft type, the number of onside and cross-side smart switches within the switching network, the number of remote units 112, and the precise data content requirements of each hosted application executing on each MCPE (102b-108b, 122b, 124b) throughout the switching network. The locations of onside smart switches 102, 106, 122 and cross-side smart switches 104, 108, 124 may be positioned for optimal system latency. For example, the onside smart switches 102, 106 and cross-side smart switches 104, 108 may be positioned generally forward, and the onside smart switch 122 and cross-side smart switch 124 positioned generally aft. The onside decentralized IMA architecture 100a and cross-side decentralized IMA architecture 100b may be connected to smart display units 116a-e, such that each display/graphics MCPE 120a-e may be connected to one onside and one cross-side smart switch (e.g., portside display graphics MCPE 120e to onside (portside) smart switching element 106a and cross-side (starboard-side) smart switching element 104a).

Remote units 112 may be directly connected to the switching network (e.g., via switching elements 122a, 124a). In some embodiments, external remote units (112c) not directly connected to the switching network may feed network data to the switching network (smart switches 102-108, 122, 124) via a concentrating smart switch (126) including, in addition to a switching element 126a and MCPE 126b, an input/output (I/O) engine 126c for verification (e.g., integrity checking) and routing of network data from the external remote units 112c to the switching network of the onside decentralized IMA architecture 100a and cross-side decentralized IMA architecture 100b, which ensures (via onside smart switches 102, 106, 122 and cross-side smart switches 104, 108, 124) that inbound network data from the external remote units 112c is routed to the appropriate hosted applications. In some embodiments, external remote units (112d) may feed network data to the switching network via a smart remote data concentrator (RDC) 128. The smart RDC 128 may include a high-performance I/O engine (128a) and an MCPE 128b. For example, each high performance I/O engine 128a may provide routing and high-integrity validity monitoring of network data received from the external remote units 112d and route the network data to individual smart switches 102-108, 122, 124 for processing. While the MCPE 128b of the smart RDC 128 may not be intended for general application hosting, the MCPE 128b may host a real-time OS (RTOS) and small applications executing in a real-time environment to provide low-latency functionality for closed-loop control systems. In some embodiments, each smart switch 102-108, 122, 124 and smart RDC 128 may be embodied on a single system-on-chip (SoC) device.

Figure 3:
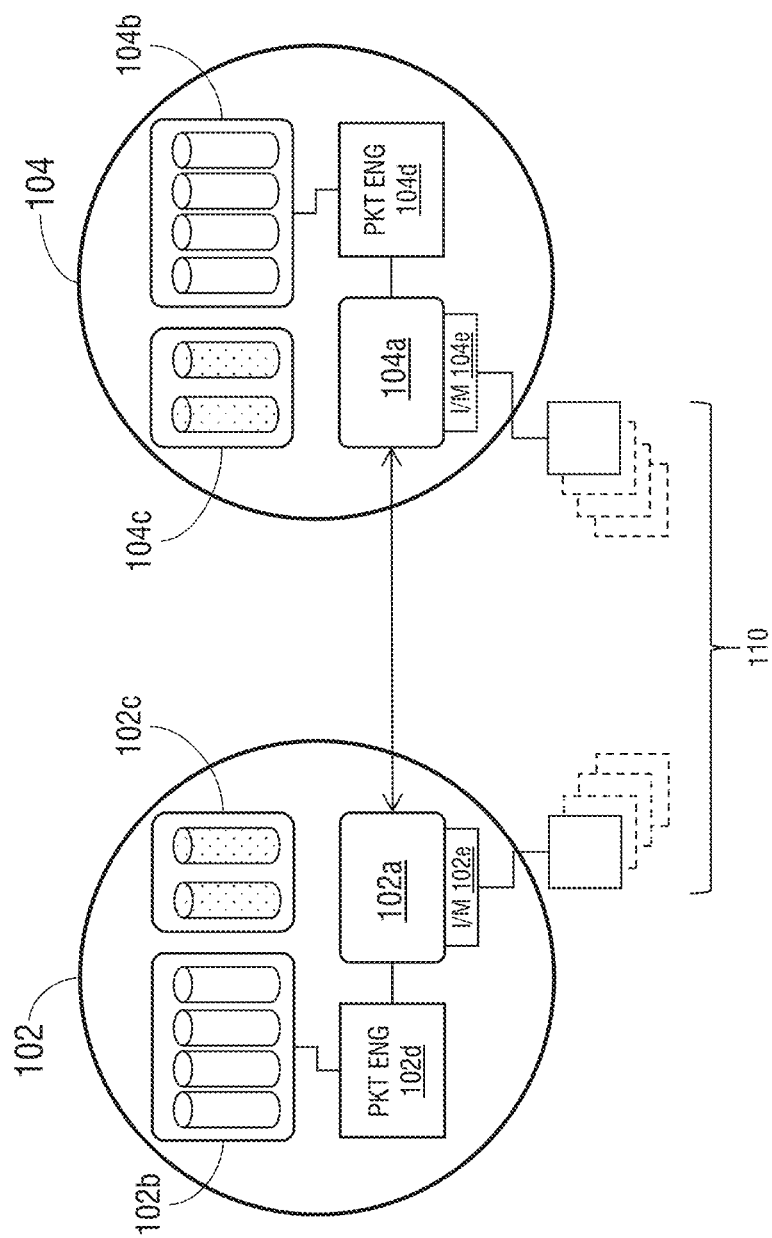
FIG. 3 is a diagrammatic illustration of smart switching devices of the decentralized IMA architecture of FIGS. 2A and 2B.

Referring now to FIG. 3, the onside smart switch 102 and cross-side smart switch 104 of FIGS. 2A and 2B may include, in addition to the switching elements 102a-104a (switching fabric) and MCPE 102b-104b, dissimilar processing cores (102c-104c), packet engines 102d-104d, and integrity monitors 102e-104e. For example, the dissimilar processing cores 102c-104c (e.g., R5 processors in the integrity domain) may manage functionality and provide monitoring of the switching elements 102b-104b. Routing of network data traveling throughout the switching network via switch ports 110 may be managed by the switch fabric (102a-104a) and integrity monitors 102e-104e. Hosted applications running on the onside MCPE 102b may communicate with the onside switching network (100a, FIG. 2A) through the onside switch fabric (102a) to the onside packet engine 102d, and with the cross-side switching network (100b, FIG. 2B) via the packet engine 102d and switch fabric 102a out to the cross-side smart switch 104.

Figure 4A:
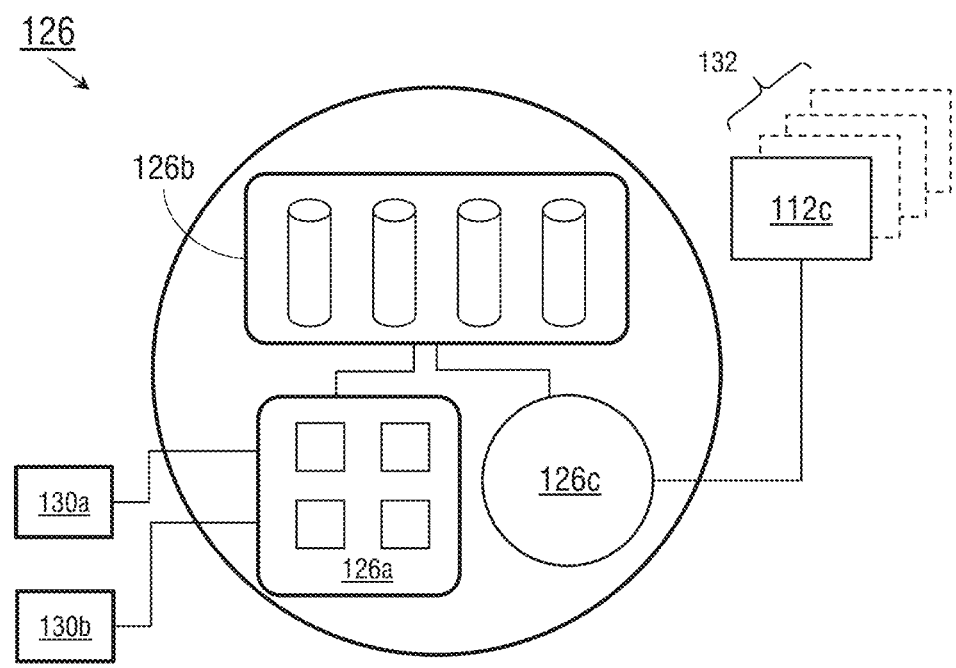
FIG. 4A is a diagrammatic illustration of a concentrating smart switching device of the decentralized IMA architecture of FIGS. 2A and 2B.

Referring now to FIG. 4A, the concentrating smart switch 126 of FIGS. 2A and 2B may be implemented and may function similarly to the smart switches 102, 104 of FIG. 3, except that the concentrating smart switch 126 may include, in addition to the switching element 126a and MCPE 126b, an I/O engine 126c. For example, the switching element 126a may connect the concentrating smart switch 126 to local area networks 130a-b (LAN; e.g. onside and cross-side local area networks) for the routing of network data (via the I/O engine 126c) through multiple information fault zones 132 (IFZ) from external remote units 112c to the smart switches (102-108, 122, 124, FIGS. 2A/B).

Figure 4B:
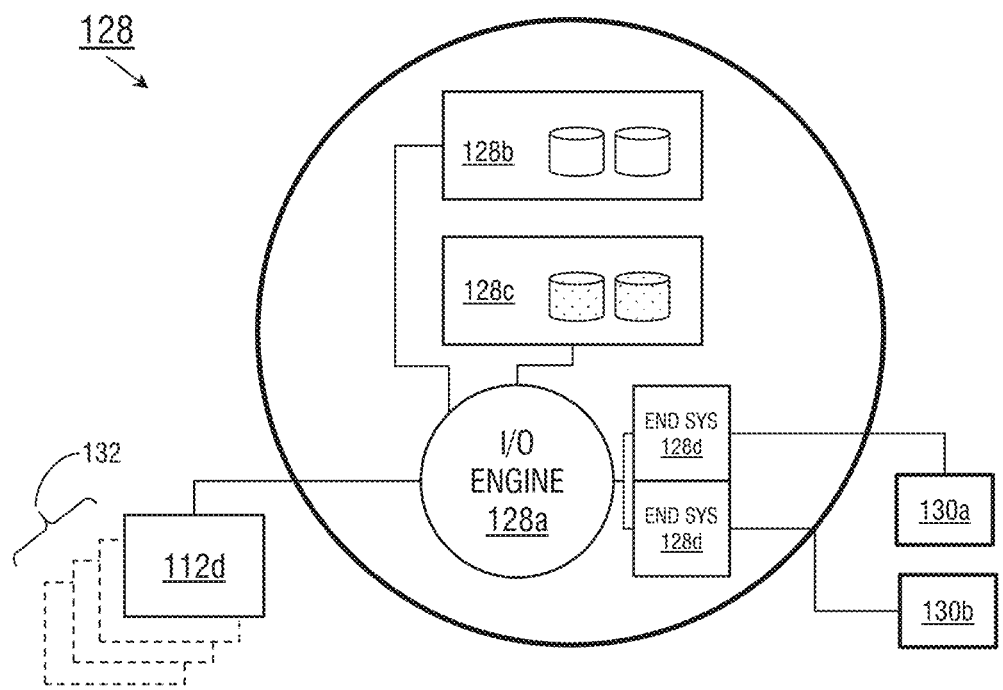
FIG. 4B is a diagrammatic illustrations of a smart remote data concentrator (RDC) of the decentralized IMA architecture of FIGS. 2A and 2B.

Referring now to FIG. 4B, the smart RDC 128 of FIGS. 2A/B may include, in addition to the high performance I/O engine 128a and MCPE 128b, dissimilar processing cores (128c) for hosting, e.g., data access layer (DAL) segregation, resource partitioning, and other integrity monitoring applications. End systems 128d (e.g., ARINC 664, 802.3) may connect the high performance I/O engine 128a to, e.g., onside and cross-side local area networks (LAN) 130a-b for the routing of network data through multiple information fault zones 132 (IFZ) from external remote units (112d) to the smart switches (102-108, 122, 124, FIGS. 2A/B). While the MCPE 128b running on the smart RDC 128 may be reserved for low-latency closed-loop functions as described above, in some embodiments additional general-purpose avionics applications may be hosted on the MCPE 128b.

As will be appreciated from the above, systems and methods according to embodiments of the inventive concepts disclosed herein may reduce system latency, equipment counts, material costs, and overall system weight/power requirements by eliminating the central computing cabinets and distributing general avionics processing to the smart switches. The resulting decentralized architecture is both more scalable and growth-capable than conventional centralized IMA architectures.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A decentralized integrated modular avionics (IMA) architecture, comprising:
one or more remote units associated with an aircraft, the one or more remote units comprising at least one of a display unit, an aircraft sensor, and a line replaceable unit (LRU);
a plurality of smart switches, each smart switch located aboard the aircraft remotely from the other smart switches and connected to at least one other smart switch, each smart switch comprising at least one multi-core processing environment (MCPE) and at least one switching element;
the MCPE coupled to the switching element and including one or more processing cores configured to host at least one of a guest operating system (GOS) and an avionics processing application associated with the one or more remote units;
the at least one display unit including at least one remote display unit, the remote display unit coupled to the switching element via at least one external graphics processor;
and
the switching element including a plurality of switch ports couplable to the at least one associated remote unit, the switching element configured to route network data between the plurality of smart switches and the one or more remote units.

2. The decentralized IMA architecture of claim 1, wherein:
the plurality of smart switches includes at least one of an onside smart switch and a cross-side smart switch, the at least one onside switch associated with an onside location corresponding to one of a port side of the aircraft and a starboard side of the aircraft, and the at least one cross-side smart switch associated with a cross-side location corresponding to a side of the aircraft opposite the onside location.

3. The decentralized IMA architecture of claim 2, wherein:
the at least one onside smart switch comprises at least one of an onside MCPE and an onside switching element, the onside MCPE connected to at least one cross-side switching element associated with the at least one cross-side smart switch;
the at least one cross-side smart switch comprises at least one of a cross-side MCPE and the cross-side switching element, the cross-side MCPE connected to at least one onside switching element associated with the at least one onside smart switch.

4. The decentralized IMA architecture of claim 1, wherein each smart switch of the one or more smart switches is embodied on a system on chip (SoC) device.

5. The decentralized IMA architecture of claim 1, wherein the plurality of switch ports includes one or more of a copper port and a fiber port.

6. The decentralized IMA architecture of claim 1, wherein the one or more remote units are first remote units, and:

the plurality of smart switches includes one or more first smart switches further comprising at least one first input/output (I/O) engine coupled to one or more second remote units, the at least one first I/O engine configured to route the network data between the plurality of smart switches and the one or more remote units.

7. The decentralized IMA architecture of claim 1, wherein the MCPE is a first MCPE, the processing core is a first processing core, the GOS is a first GOS, and the avionics processing application is a first avionics processing application, further comprising:
at least one smart remote data concentrator (RDC) coupled to the plurality of smart switches and to the one or more remote units, the at least one smart RDC comprising:
at least one second MCPE including one or more processing cores configured to host at least one of a real time OS and a second avionics processing application; and
at least one I/O engine coupled to the at least one second MCPE, the I/O engine configured to route network data between the one or more remote units and the plurality of smart switches.

8. The decentralized IMA architecture of claim 7, wherein the at least one smart RDC is embodied on a system on chip (SoC) device.

9. A decentralized integrated modular avionics (IMA) architecture, comprising:
one or more remote units associated with an aircraft, the one or more remote units comprising at least one of a display unit, an aircraft sensor, and a line replaceable unit (LRU);
a plurality of smart switches, each smart switch located aboard the aircraft remotely from the other smart switches and connected to at least one other smart switch, each smart switch comprising at least one first multi-core processing environment (MCPE) and at least one switching element;
the first MCPE coupled to the switching element and including one or more processing cores configured to host at least one of a guest operating system (GOS) and an avionics processing application associated with the one or more remote units;
the at least one display unit including at least one smart display unit comprising at least one second MCPE, the second MCPE including one or more second processing cores configured to host at least one of the at least one GOS, a graphics generation application, and a display application;
and
the switching element including a plurality of switch ports couplable to the at least one associated remote unit, the switching element configured to route network data between the plurality of smart switches and the one or more remote units.

10. The decentralized IMA architecture of claim 9, wherein:
the plurality of smart switches includes at least one of an onside smart switch and a cross-side smart switch, the at least one onside switch associated with an onside location corresponding to one of a port side of the aircraft and a starboard side of the aircraft, and the at least one cross-side smart switch associated with a cross-side location corresponding to a side of the aircraft opposite the onside location.

11. The decentralized IMA architecture of claim 10, wherein:
the at least one onside smart switch comprises at least one of an onside MCPE and an onside switching element, the onside MCPE connected to at least one cross-side switching element associated with the at least one cross-side smart switch;
the at least one cross-side smart switch comprises at least one of a cross-side MCPE and the cross-side switching element, the cross-side MCPE connected to at least one onside switching element associated with the at least one onside smart switch.

12. The decentralized IMA architecture of claim 9, wherein each smart switch of the one or more smart switches is embodied on a system on chip (SoC) device.

13. The decentralized IMA architecture of claim 9, wherein the plurality of switch ports includes one or more of a copper port and a fiber port.

14. The decentralized IMA architecture of claim 9, wherein the one or more remote units are first remote units, and:
the plurality of smart switches includes one or more first smart switches further comprising at least one first input/output (I/O) engine coupled to one or more second remote units, the at least one first I/O engine configured to route the network data between the plurality of smart switches and the one or more remote units.

15. The decentralized IMA architecture of claim 9, wherein the avionics processing application is a first avionics processing application, further comprising:
at least one smart remote data concentrator (RDC) coupled to the plurality of smart switches and to the one or more remote units, the at least one smart RDC comprising:
at least one third MCPE including one or more processing cores configured to host at least one of a real time OS and a second avionics processing application;
and
at least one I/O engine coupled to the at least one third MCPE, the I/O engine configured to route network data between the one or more remote units and the plurality of smart switches.

16. The decentralized IMA architecture of claim 15, wherein the at least one smart RDC is embodied on a system on chip (SoC) device.

* * * * *